(12) United States Patent
Barton et al.

(10) Patent No.: US 7,251,065 B2
(45) Date of Patent: Jul. 31, 2007

(54) IMAGE COLOR BALANCE FOR SCANNERS USING AN ILLUMINATION SPECTRAL SENSOR

(75) Inventors: Mark A. Barton, Virginia Beach, VA (US); George O. Simmons, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1029 days.

(21) Appl. No.: 10/062,049

(22) Filed: Jan. 31, 2002

(65) Prior Publication Data

US 2003/0147110 A1 Aug. 7, 2003

(51) Int. Cl.
*H04N 1/46* (2006.01)
(52) U.S. Cl. .................. 358/509; 358/505; 358/523
(58) Field of Classification Search ................ 358/406, 358/504, 523, 509, 475, 487, 516, 505, 506, 358/445, 446; 250/214 C, 214 DC, 216
See application file for complete search history.

(56) References Cited

U.S. PATENT DOCUMENTS

| | | | |
|---|---|---|---|
| 4,408,231 A | 10/1983 | Bushaw et al. | 358/406 |
| 4,679,073 A | 7/1987 | Hayashi | 358/516 |
| 4,945,405 A | 7/1990 | Hirota | 358/516 |
| 4,989,100 A | 1/1991 | Ishima | 358/483 |
| 5,278,674 A | 1/1994 | Webb et al. | 358/475 |
| 5,285,293 A | 2/1994 | Webb et al. | 358/471 |
| 5,361,140 A * | 11/1994 | Hayenga et al. | 358/446 |
| 5,654,809 A | 8/1997 | Beeman et al. | 358/504 |
| 5,894,356 A | 4/1999 | Yoo | 358/515 |
| 5,982,957 A | 11/1999 | DeCaro et al. | 382/312 |
| 6,072,603 A | 6/2000 | Parks | 358/504 |
| 6,078,684 A | 6/2000 | Inoue | 382/162 |
| 6,101,273 A | 8/2000 | Matama | 382/169 |
| 6,191,872 B1 | 2/2001 | DeCaro et al. | 358/509 |
| 6,444,971 B1 * | 9/2002 | Engelhardt et al. | 250/214 DC |

* cited by examiner

*Primary Examiner*—Cheukfan Lee
(74) *Attorney, Agent, or Firm*—Peyton C. Watkins

(57) ABSTRACT

An image scanning system for producing an electronic version of a hardcopy element which is compensated for spectral content of an illumination source in the image scanning system, the image scanning system includes a sensor for receiving light containing the hardcopy element for forming and storing an electronic version of the hardcopy element; a spectral sensor for receiving light from the illumination source and storing an electronic version of spectral contents of the illumination source; and a conversion system for receiving the electronic versions of the illumination source and the hardcopy element and creating a compensation table that compensates subsequent hardcopy elements passed through the conversion system.

7 Claims, 1 Drawing Sheet

IMAGE COLOR BALANCE FOR SCANNERS USING AN ILLUMINATION SPECTRAL SENSOR

APPENDIX

The disclosure in the appendix of this patent disclosure of this patent document contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever.

FIELD OF THE INVENTION

The present invention relates to color image scanning systems and, more particularly, to such scanning systems having spectral compensation for the illumination source within the scanning system.

BACKGROUND OF THE INVENTION

The physical phenomenon of light occurs over a continuous range of wavelengths, some of which are visible to the human eye. Color is actually the distribution of energy throughout the visible spectrum of light. To accurately and fully represent the actual energy distribution (color) at a single point, it would require a long list of numbers representing the intensity of the light at various wavelengths.

The human eye doesn't sense color in this level of detail though. The human retina contains three types of color sensitive receptors (cones). Each type of cone has a different range of wavelengths of light for which it is sensitive. The combination of the three different sensitivities divides the visible spectrum into three overlapping sub-ranges that the eye/brain perceives collectively as color. In order for two colors to look identical, they don't necessarily have to have identical wavelength spectrums. They only need to have the same amount of energy in the three sensitivity ranges that the eye senses.

Most electronic representations of color take advantage of the eye and brain's simplified perception mechanism, and only utilize three numeric values to represent a specific color. There are a variety of different three channel (three numeric values) color spaces that are commonly used. The different color spaces are all representations of the same original spectrum of light in the image. Each channel of a color space represents the weighted energy content over a specific range of wavelengths of light. Each color space is defined by (either directly or indirectly) a set of weighting curves that specify how the continuous color spectrum contributes to each channel of the color space.

Typically, color image sensors in a scanner deliver three channels of data to the image processing electronics, representing the red, green, and blue content of the image. Similar to the eye, these are three overlapping sub-ranges of the visible spectrum of light. However, they are different sub ranges from those of the human eye. They are also generally subtly different from the red, green, and blue of the industry standard color space called sRGB.

The role of the color correction and conversion hardware/software algorithms in image processing electronics is to perform the conversion from the image sensors RGB to standard sRGB, and possibly to another color space. This is commonly performed with a look up table (LUT). Each input vector (sensor RGB combination) maps to a single specific output vector in the output color space. To exhaustively tabulate all possible input colors would require an excessively large look up table, so actual designs usually contain a subset of points, and interpolate between them. This is commonly referred to as a three dimensional (3D) LUT because there are three components in the input vector (image sensor RGB). There are usually three components in the output vector as well, which really makes the system three independent 3D-LUTs, each with a single channel of output.

The accuracy of such a system can only be as good as the contents of the LUT. Most current systems do not vary the contents of the 3D LUT during operation. Instead, a LUT is selected at the time the system is designed. Usually some form of white balance system is employed to ensure that the scaling of the inputs to the 3D-LUT is consistent over time.

Current state of the art white balance subsystems, in similar applications, involve the use of a white reference area introduced into or included in the primary scanning area. The color detected by the main scanning apparatus in the reference area is measured and compared with a predetermined aim point, and corresponding adjustments are made to gain stages in each of the detection system channels.

Although the currently used and utilized system for compensating LUTs is satisfactory, they include drawbacks. These white balance systems compensate for variations in illumination intensity and optical throughput. They do not, however, compensate for all possible variations in the color spectral content of the illumination.

Consequently, a need exists for scanning systems that compensate for the color spectral content of the illumination.

SUMMARY OF THE INVENTION

The present invention is directed to overcoming one or more of the problems set forth above. Briefly summarized, according to one aspect of the present invention, the invention is a method for maintaining the white balance, and color accuracy of an electronic image acquisition system, as in an image scanner. The invention utilizes a sensor exposed to the illumination source, which yields detailed spectral content information. This sensor delivers a set of signals that represent the spectral content of the illumination light source. The spectral information represents the power or intensity of the illumination source, measured in a set of predefined wavelength ranges. This spectral information is then utilized by a compensation algorithm, which computes a 3D-color look up table (LUT) that will properly transform the uncompensated camera output to a standard color space. The algorithm takes advantage of pre-determined knowledge of the reflective or transmissive properties of the target media, optical systems spectral sensitivity, the sensors spectral sensitivity, and the idealized spectral weighting of the desired output color space, to properly balance the output of the LUT for the measured illumination. This method has the significant advantage that it will produce properly balanced color output throughout the entire color gamut, not just at the white point, or grayscale.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
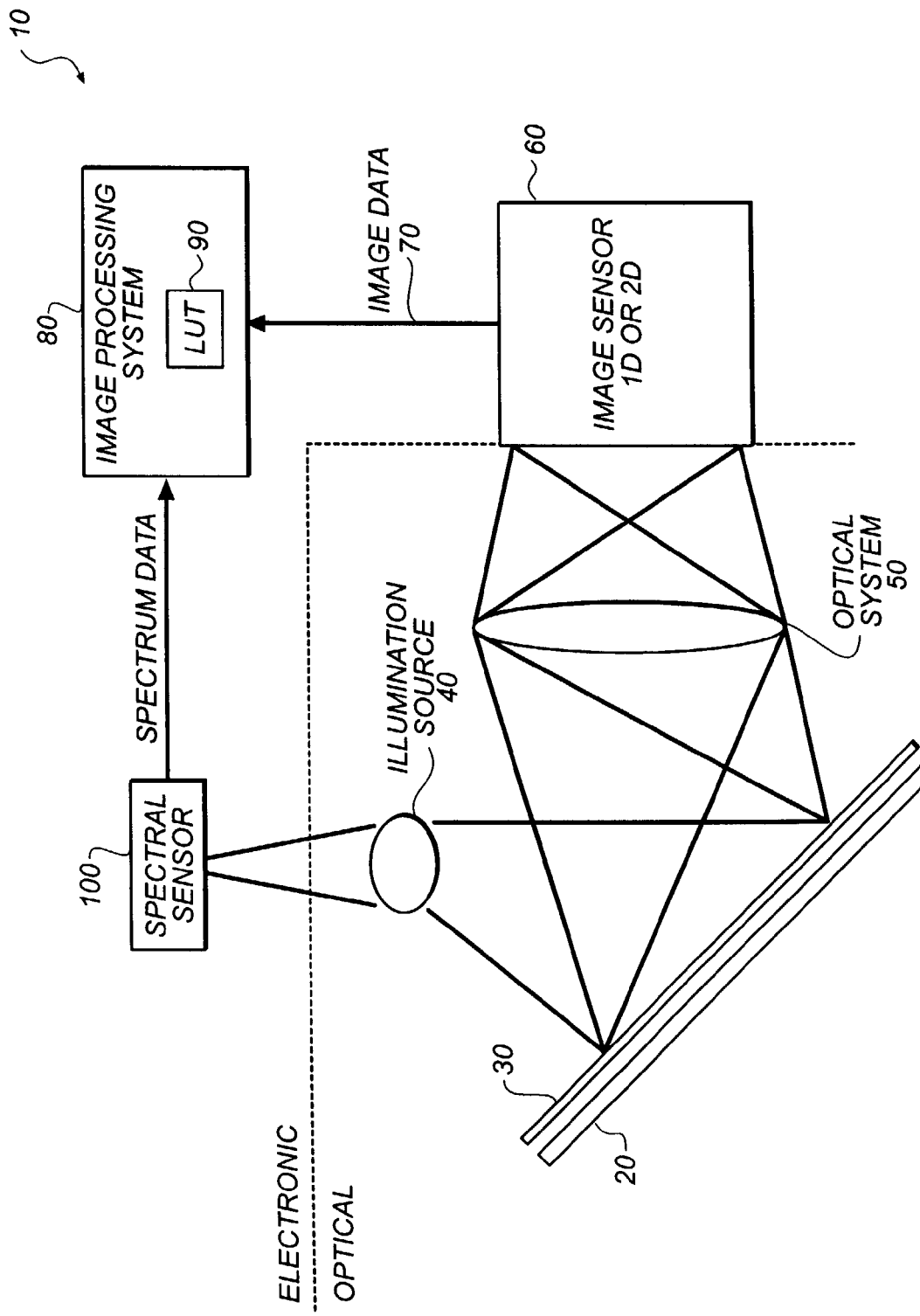
FIG. 1 is a schematic diagram of an illumination spectral compensation system for an image scanning system of the present invention.

Output signals are generated by a variety of factors. The illumination light spectrum falls on the target image being scanned. A transmission or reflection function carries part of that light to the optical system that then delivers it to the opto-electronic sensor. The optics also has a transmission function as well and further modifies the spectral content of the signal. The sensing element itself is the point where the continuous optical spectrum is converted to a set of discrete signals, each signal representing one channel of the sensors output color space. The above-described system is represented by the following equation.

$$SensorOutput_c = \int_{\lambda min}^{\lambda max} Illumination(\lambda) \cdot ReflectiveImage(\lambda) \cdot OpticalTransfer(\lambda) \cdot SensorTransfer_c(\lambda) d\lambda$$

Each symbol on the right side of the integral is a function of wavelength. The sensor output channels are written as functions of the illumination, reflective transfer function, image content, optical transfer function, and the sensors spectral sensitivity function.

In this equation, the result of the integral is the expected output of one channel of the image sensor. The subscript c denotes which channel is being evaluated. The terms in the equation are defined in the following table.

| Function | Definition |
| --- | --- |
| Illumination ($\lambda$) | This function describes the spectral content of the light source, as detected by the illumination sensor, as a function of wavelength. |
| ReflectiveImage ($\lambda$) | This function describes the color content of the image at the point of evaluation, compounded with the transmission or reflective process of the scanning path, as a function of wavelength. |
| OpticalTransfer ($\lambda$) | This function describes the transmission of the optical path, as a function of wavelength. |
| SensorTransfer ($\lambda$) | This function describes the sensitivity of the opto-electronic sensor, as a function of wavelength. |

In regards to the ideal output that we are attempting to achieve, the idealized wavelength transfer functions for the desired output color space define what output level should be produced for a given illumination and reflection function. So if the scanning system were perfect, it would produce output signals given by the following equation.

$$OptimalOutput_c = \int_{\lambda min}^{\lambda max} Image(\lambda) \cdot ColorSpaceTransfer_c(\lambda) d\lambda$$

The result of this integral is the ideal output of the scanning system at the given color of the reflective image, and is independent of the illumination function. The scanner output would not vary with illumination. The terms in this equation are described in the following table.

| Function | Definition |
| --- | --- |
| Image ($\lambda$) | This function describes the color content of the image at the point of evaluation, as a function of wavelength |
| ColorSpaceTransfer ($\lambda$) | This function describes the weighting of the given channel of the color space, as a function of wavelength. |

The role of the 3D LUT system of the present invention is to transform the sensing systems channel outputs (which are the result of the first equation) into the desired outputs (the result of the second). This is achieved by periodically using an illumination spectral sensor in the following manner. The first integral is performed numerically, using a broad range of hypothetical image spectrums that represent the full color gamut, to determine what the color sensing system outputs would be with the current illumination. For each hypothetical image spectrum evaluated, the second integral is performed (or the results may be tabulated if the set of spectra utilized is static), to determine what the LUT outputs should be for the given hypothetical image spectrum. As each hypothetical image spectrum is evaluated, the corresponding point in the LUT is completed (and recorded) with the results of the second integral. When all of the representative hypothetical image spectra have been evaluated, the LUT contents are examined, and any entries in the LUT that have not been completed are interpolated from their nearest neighbors. Empty LUT entries occur when none of the representative hypothetical image spectra produce sensing system channel outputs which correspond to that entry in the LUT.

The entire procedure is disclosed in the form of pseudo-code in the appendix.

Referring to FIG. 1, there is shown an image scanning system 10 for implementing the present invention. The scanning system 10 includes a scanner platen 20 for holding the image or document 30 to be scanned, which image or document is illuminated by an illumination source 40. A conventional and well-known optical system 50 receives the reflected image and passes it to an image sensor 60 that stores the image as an electrical charge. The charge is converted to a digital signal by conventional analog to digital systems (not shown), if not converted by the sensor, and is eventually passed via a communication link 70 to an image processing system 80 containing the above-described LUT 90 of the present invention.

The LUT 90 converts received input to a compensated output that is compensated for the spectral illumination source 40 according to the above-described algorithms.

The present invention also includes a mechanism for re-tabulating the LUT 90 for compensating the output on some periodic-time basis. In this regard, a spectral sensor 100 senses the spectral content of the illumination source 40 and also passes it to the image processing system 80. The image processing system 90 takes this input and re-tabulates the LUT 90 based on the new inputs. Consequently, all images now passed through the image processing system 90 are compensated according to the LUT 90.

The invention has been described in detail with particular reference to certain preferred embodiments thereof, but it will be understood that variations and modifications can be effected within the spirit and scope of the invention.

| PARTS LIST | |
|---|---|
| 10 | image scanning system |
| 20 | platen |
| 30 | image or document |
| 40 | illumination source |
| 50 | optical system |
| 60 | image sensor |
| 70 | communication link |
| 80 | image processing system |
| 90 | LUT |
| 100 | spectral sensor |

What is claimed is:

1. An image scanning system for producing an electronic version of a hardcopy which is compensated for variations in the spectral content of an illumination source in the image scanning system, the image scanning system comprising:
   (a) a first sensor for receiving light reflected or transmitted from the hardcopy, and for forming and storing an electronic image version of the hardcopy;
   (b) a second sensor for receiving light from the illumination source and for forming and storing an electronic version of the spectral contents of the illumination source; and
   (c) a conversion system for receiving the electronic version of the illumination source, and computing the contents of a LUT (Look Up Table) such that subsequent electronic images passed through the LUT are properly compensated for the spectral content of the illumination.

2. The scanning system as in claim 1, wherein the conversion system is created from the equations:

$$SensorOutput_c = \int_{\lambda min}^{\lambda max} Illumination(\lambda) \cdot ReflectiveImage(\lambda) \cdot OpticalTransfer(\lambda) \cdot SensorTransfer_c(\lambda) d\lambda$$

$$OptimalOutput_c = \int_{\lambda min}^{\lambda max} Image(\lambda) \cdot ColorSpaceTransfer_c(\lambda) d\lambda$$

where,

SensorOutput$_c(\lambda)$ is an expected output of one channel of the image sensor;

Illumination($\lambda$) is a function that describes the spectral content of the light source as detected by the illumination sensor, as a function of wavelength;

ReflectiveImage($\lambda$) is a function that describes the color content of the image at the point of evaluation, compounded with the transmission or reflective process of the scanning path, as a function of wavelength;

OpticalTransfer($\lambda$) is a function that describes the transmission of the optical path, as a function of wavelength;

SensorTransfer$_c(\lambda)$ is a function that describes the sensitivity of the first sensor, as a function of wavelength;

OptimalOutput$_c(\lambda)$ is an ideal output of the scanning system at a given color of the reflective image;

Image($\lambda$) is a function that describes the color content of the image at the point of evaluation, as a function of wavelength;

ColorSpaceTransfer$_c(\lambda)$ is a function that describes the weighting of a given channel of a color space, as a function of wavelength; and Subscript "c" denotes the sensor channel being evaluated.

3. The scanning system in claim 1, wherein the conversion system includes as a table or LUT for implementation.

4. The scanning system as in claim 3, wherein the conversion system includes a mathematical scheme that interpolate entries in the LUT or table.

5. An image scanning system for producing an electronic version of a hardcopy which is compensated for variations in the spectral content of an illumination source in the image scanning system, the image scanning system comprising:
   (a) a color sensor for receiving light reflected or transmitted from the hardcopy, and for forming and storing an electronic version of the hardcopy;
   (b) a spectral sensor for receiving light from the illumination source and for forming and storing an electronic version of the spectral contents of the illumination source;
   (c) a conversion operator that compensates the electronic version of the hardcopy, wherein the conversion operator includes a LUT or table for implementation; and
   (d) a conversion system for receiving the electronic version of the illumination source, wherein the conversion system compensates the electronic version of the hardcopy.

6. The scanning system as in claim 5, wherein the conversion operator is created from the equations:

$$SensorOutput_c = \int_{\lambda min}^{\lambda max} Illumination(\lambda) \cdot ReflectiveImage(\lambda) \cdot OpticalTransfer(\lambda) \cdot SensorTransfer_c(\lambda) d\lambda$$

$$OptimalOutput_c = \int_{\lambda min}^{\lambda max} Image(\lambda) \cdot ColorSpaceTransfer_c(\lambda) d\lambda$$

where,

SensorOutput$_c(\lambda)$ is an expected output of one channel of the image sensor;

Illumination($\lambda$) is a function that describes the spectral content of the light source as detected by the illumination sensor, as a function of wavelength;

ReflectiveImage($\lambda$) is a function that describes the color content of the image at the point of evaluation, compounded with the transmission or reflective process of the scanning path, as a function of wavelength;

OpticalTransfer($\lambda$) is a function that describes the transmission of the optical path, as a function of wavelength;

SensorTransfer$_c(\lambda)$ is a function that describes the sensitivity of the first sensor, as a function of wavelength;

OptimalOutput$_c(\lambda)$ is an ideal output of the scanning system at a given color of the reflective image;

Image($\lambda$) is a function that describes the color content of the image at the point of evaluation, as a function of wavelength;

ColorSpaceTransfer$_c(\lambda)$ is a function that describes the weighting of a given channel of a color space, as a function of wavelength; and Subscript "c" denotes the sensor channel being evaluated.

7. The scanning system as in claim 5, wherein the conversion operator includes a mathematical scheme that interpolate entries in the LUT or table.

* * * * *